3 Sheets--Sheet 1.

W. ADAIR.

Pumps.

No. 6,028. Reissued Aug. 25, 1874.

WITNESSES:
James H. Hunter
A. Stewart

INVENTOR:
William Adair

THE GRAPHIC CO. PHOTO-LITH. 39 & 41 PARK PLACE, N.Y.

3 Sheets--Sheet 2.

W. ADAIR.

Pumps.

No. 6,028. Reissued Aug. 25, 1874.

Witnesses:
James H. Hunter
H. Newell

Inventor:
William Adair

THE GRAPHIC CO. PHOTO-LITH. 39 & 41 PARK PLACE, N.Y.

3 Sheets--Sheet 3.

W. ADAIR.

Pumps.

No. 6,028.

Reissued Aug. 25, 1874.

*Witnesses,*
James H. Hunter
K. Newell

*Inventor,*
William Adair

THE GRAPHIC CO. PHOTO-LITH. 39 & 41 PARK PLACE, N.Y.

UNITED STATES PATENT OFFICE.

WILLIAM ADAIR, OF LIVERPOOL, ENGLAND.

IMPROVEMENT IN PUMPS.

Specification forming part of Letters Patent No. 78,854, dated June 16, 1868; antedated April 5, 1867; reissue No. 6,028, dated August 25, 1874; application filed August 18, 1874.

*To all whom it may concern:*

Be it known that I, WILLIAM ADAIR, of Liverpool, England, have invented certain new and useful Improvements in Pumps; and I do hereby declare that the following is a full, clear, and exact description thereof, reference being had to the drawings accompanying and forming a part of this specification.

My invention consists, first, in the employment, in a double-acting pump, of a water head or chamber situated above the discharging-chambers and the chamber containing the plunger, in which latter chamber a vacuum is formed on the downward as well as on the upward stroke of the plunger. The object of this part of my invention is to always have a packing of water on the upper side of the chamber, in which the vacuum is so formed, thereby more perfectly preserving the vacuum which is formed on the downward stroke of the pump, and doing away with the necessity for the use of the stuffing-box generally employed with the cylinder-head and piston-rod in the old construction, and obviating the imperfect working of the old construction of pumps in cases where the stuffing-box has been attempted to be dispensed with. Second, in so constructing the chamber containing the plunger, and in which there is found a vacuum at the downward stroke of the plunger, as hereinafter stated, that it shall discharge the water lifted into it by such vacuum directly into the water head or chamber above.

Figure 1:
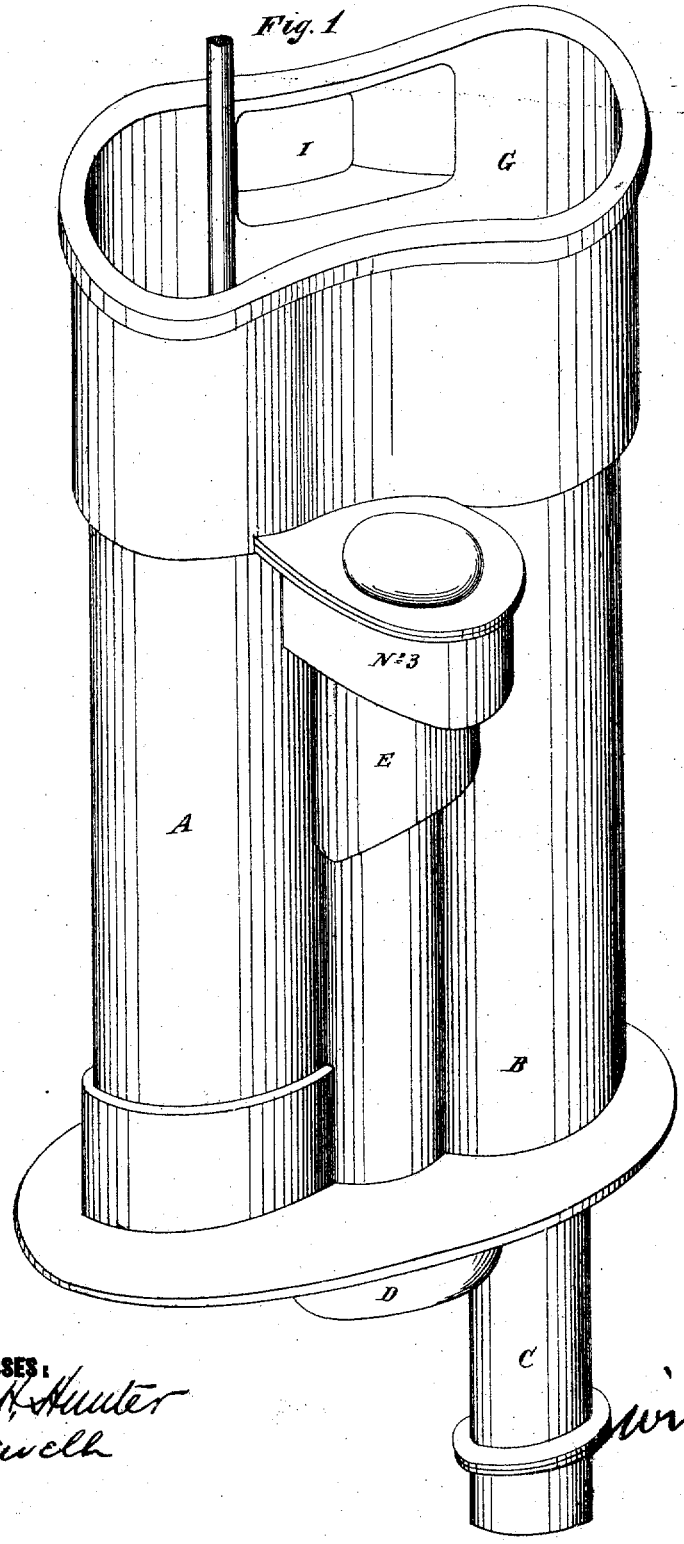
Figure 2:
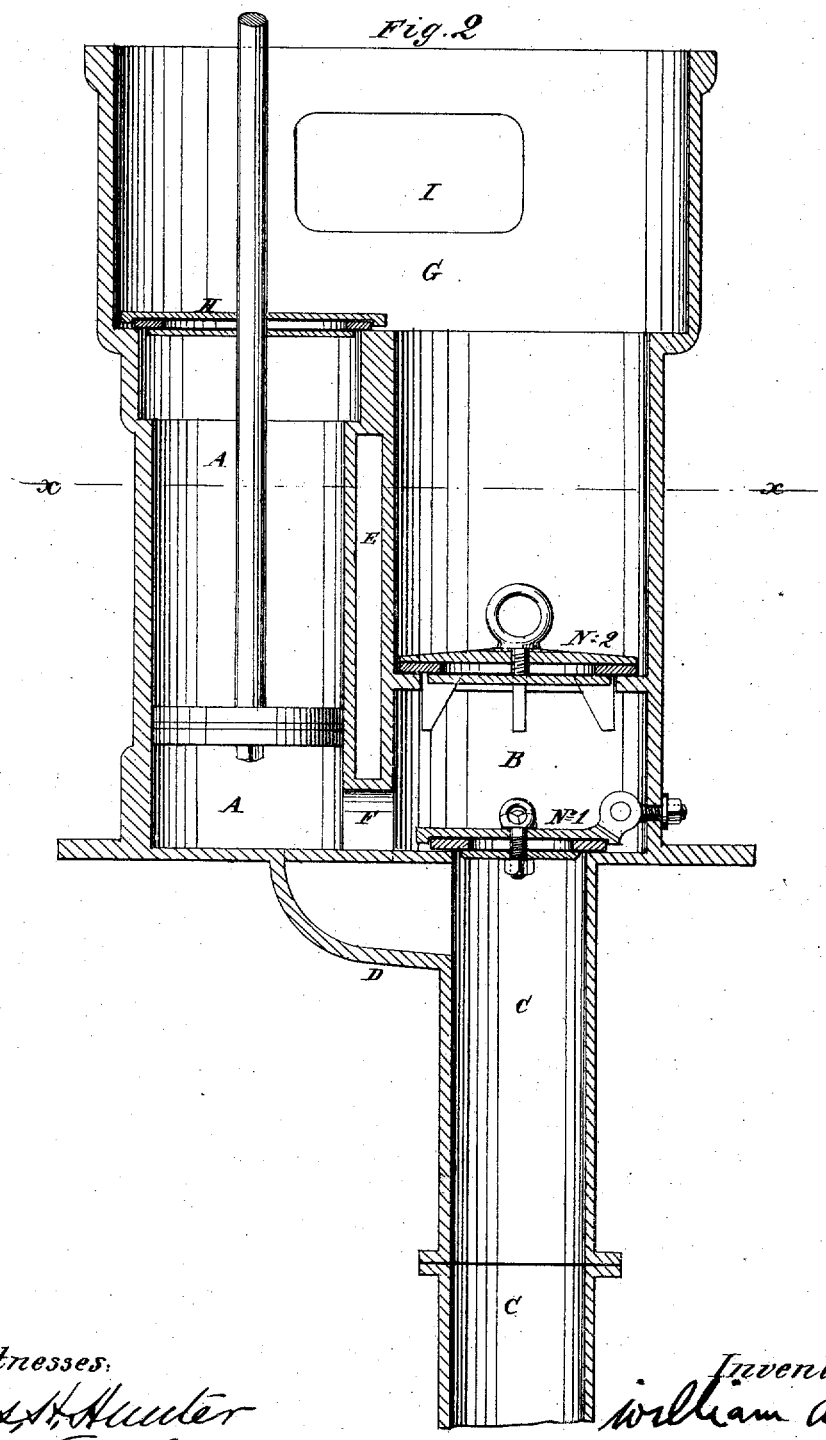
Figure 3:
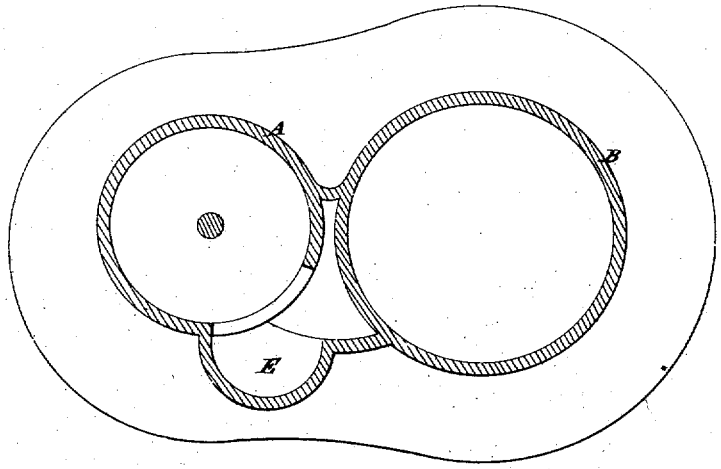

In the drawings, serving to illustrate one form in which my invention may be carried out, Figure 1 is a perspective view of a pump embodying both of my improvements. Fig. 2 is a vertical central section of the same; and Fig. 3 is a horizontal section of the same, taken through the line *x x* of Fig. 2.

A is the chamber containing the plunger and piston-rod, and which also in this arrangement about to be described of the parts of the pump, acts as one of the discharging-chambers. B is the other discharging-chamber. C is the feed or suction pipe. D is the branch of the feed-pipe at the bottom of the chamber B. E is the branch from the same to the top of the chamber A; and F the port or communication between the two chambers A and B. In this pump there are three ordinary valves: No. 1 opening from the feed-pipe up and into the bottom of the chamber B. No. 2 is placed in and across the chamber B a short distance above No. 1. It opens upward, allowing the water to pass off through a water head or chamber, G. This last-mentioned chamber is situated immediately above the vacuum-chamber, so as to always keep a supply of water on that end of it which is above the plunger, and through which end the piston-rod of such plunger passes. These valves Nos. 1 and 2 form between them the vacuum necessary for the supply of water to the under side of the plunger to be discharged during the downward stroke. The third valve is situated in and across the upper branch of the feed-pipe, and just before its entry into the chamber A. The box of this valve is marked No. 3. In addition to these valves there is the port or communication F between the bottom of the two chambers A and B, but closed to the feed-pipe, and situated between valves 1 and 2. During the upward stroke the plunger raises the water which is above it in the cylinder A, (previously admitted through No. 3 valve now closed,) slightly elevating the cover H, and discharging the water into the water head or chamber G, and from thence it passes out through the nozzle I. At the same time the water in the feed-pipe C opens valve No. 1, No. 2 remaining closed, and pours through the port F into the cylinder A under the plunger, to be ready for the downward stroke. During the downward stroke the plunger forces the water now collected below it through the port F (closing valve No. 1 and opening No. 2) up through the cylinder B, and discharging it into the water head or chamber G, and from thence it passes out through the nozzle I. During this time the water in the feed-pipe C (No. 1 valves being closed) is drawn up through the branches D and E, raising valve No. 3 and filling the space above the plunger, between it and the cylinder-cover H, to be ready to be discharged into the water head or chamber G, and thence out through the nozzle I, in manner as before set forth, by the upward stroke.

It is evident from the description of one form of pump embodying the first portion of my improvements that, by reason of the water being discharged into a head or chamber arranged above the vacuum-chamber, in a manner substantially as herein described, that there is always a packing of water immediately over the vacuum-chamber, and thus all air is prevented from entering such vacuum-chamber on the downward stroke of the pump, whether a stuffing-box is used or not. With this invention, however, it is quite safe to dispense with such stuffing-box.

That portion of my improvements which admits of the passage of the water from the upper part of the vacuum-chamber into the water head or chamber is of great economy in the construction of the pump; and by means of it there is greater facility for cleaning and repairs. When such portion of my improvements are proposed to be adopted, the particular relative arrangement of parts shown in my drawings will be found very efficient in practice.

I claim—

1. A water head or chamber, in combination with the plunger vacuum-chamber of the pump, for the purpose of avoiding the necessity of a stuffing-box to the piston-rod of the pump, substantially as described.

2. The water-head or chamber, in combination with the plunger vacuum-chamber cover constructed so as to form a valve, substantially as described.

WILLIAM ADAIR.

Witnesses:

JAMES H. HUNTER,
K. NEWELL.